United States Patent
Lee

(10) Patent No.: US 6,295,826 B1
(45) Date of Patent: Oct. 2, 2001

(54) SELF-CONTAINED ROOFTOP HVAC UNIT

(75) Inventor: Mike S. S. Lee, York, PA (US)

(73) Assignee: Trans/Air Manufacturing Corp., Dallastown, PA (US)

( * ) Notice: Subject to any disclaimer, the term of this patent is extended or adjusted under 35 U.S.C. 154(b) by 0 days.

(21) Appl. No.: 09/450,133

(22) Filed: Nov. 26, 1999

(51) Int. Cl.$^7$ .................................................. B60H 1/32

(52) U.S. Cl. .......................................... 62/244; 62/DIG. 16
(58) Field of Search ................................ 62/DIG. 16, 244

(56) References Cited

U.S. PATENT DOCUMENTS

| | | | |
|---|---|---|---|
| 4,201,064 | * | 5/1980 | Krug et al. ............................. 62/244 |
| 4,727,728 | * | 3/1988 | Brown .................................... 62/244 |
| 4,732,011 | * | 3/1988 | Haiya ..................................... 62/244 |
| 4,905,478 | * | 3/1990 | Matsuda et al. ................. 62/DIG. 16 |
| 4,926,655 | * | 5/1990 | King ................................. 62/DIG. 16 |
| 5,209,081 | * | 5/1993 | Matsuoka ............................... 62/244 |
| 5,605,055 | * | 2/1997 | Salgado ........................... 62/DIG. 16 |
| 5,632,330 | * | 5/1997 | Drucker et al. ........................ 62/244 |

OTHER PUBLICATIONS

Carrier Transicold brochure, 1995, Roofmount Systems.

* cited by examiner

Primary Examiner—William E. Tapolcai
(74) Attorney, Agent, or Firm—Jacobson Holman, PLLC

(57) ABSTRACT

A heating, ventilating and air conditioning unit adapted for mounting on the roof of a bus or similar vehicle. The HVAC unit is self-contained, lightweight and provides adequate cooling, heating and ventilation to a bus passenger compartment or the occupant compartment of a similar vehicle. The HVAC unit has a unique cross-pattern arrangement of evaporator and condenser assemblies which enables air distribution from the system to function in a ducted system or a free blow system depending upon orientation of the condensers and evaporators. The HVAC unit is of compact construction and includes modular characteristics provided by the allocation of one fan to one condenser and one blower to one evaporator to enhance system performance and system redundancy. The HVAC units include diagonal symmetry of components which further improves modularity, commonality and serviceability. The unique construction of the HVAC unit enables it to be oriented in various modular arrangements so that it can be used as a single module for small or medium sized buses and as dual modules for medium to large size buses.

6 Claims, 11 Drawing Sheets

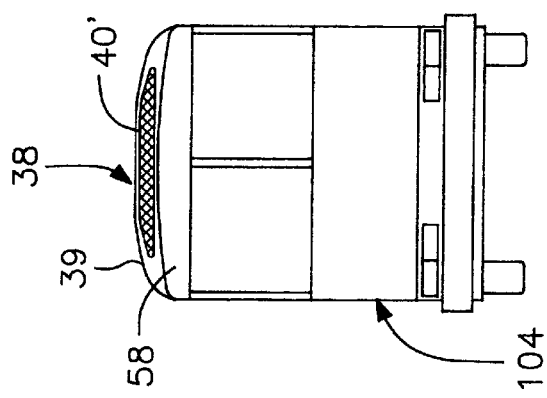
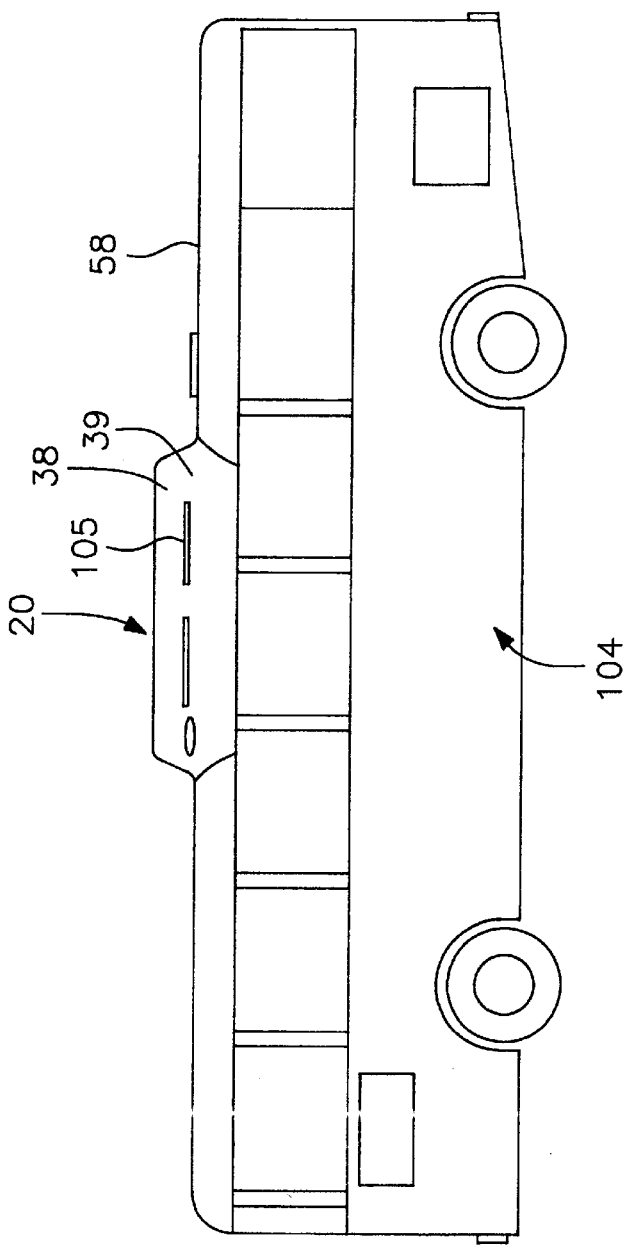

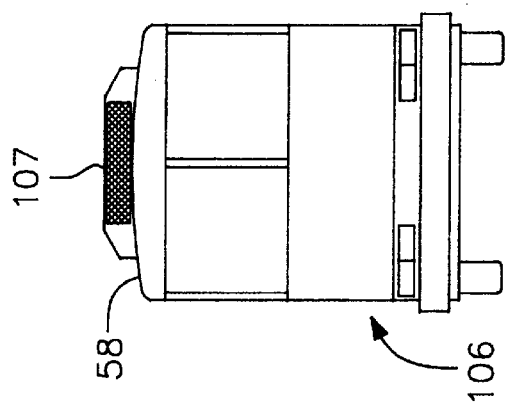
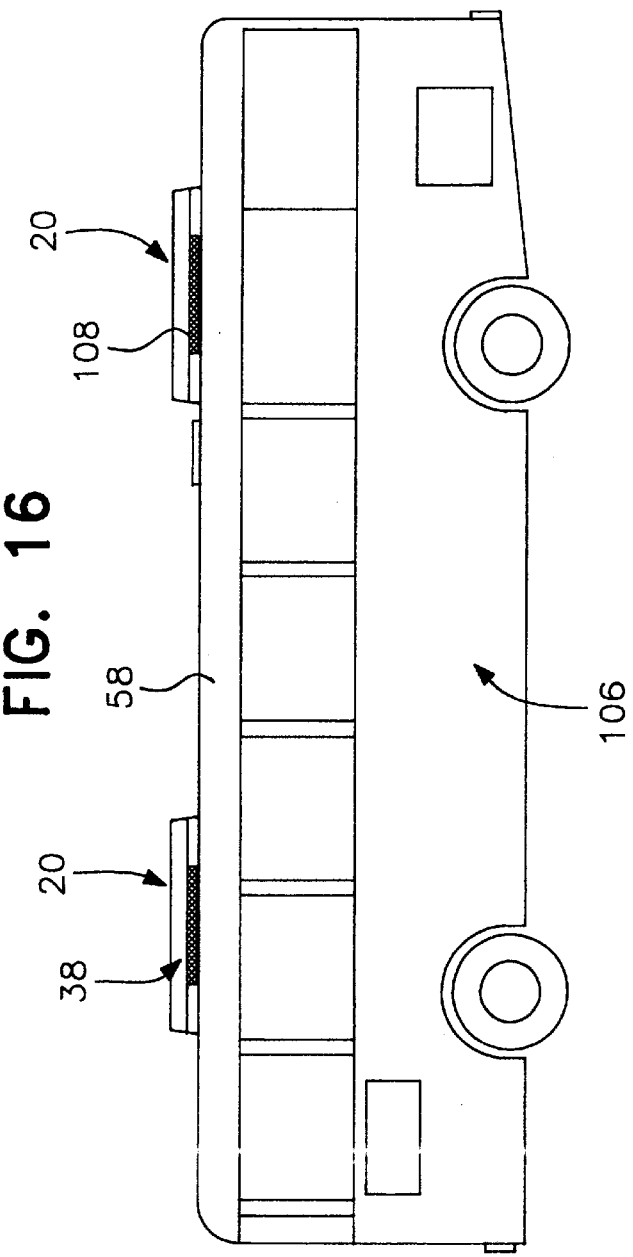

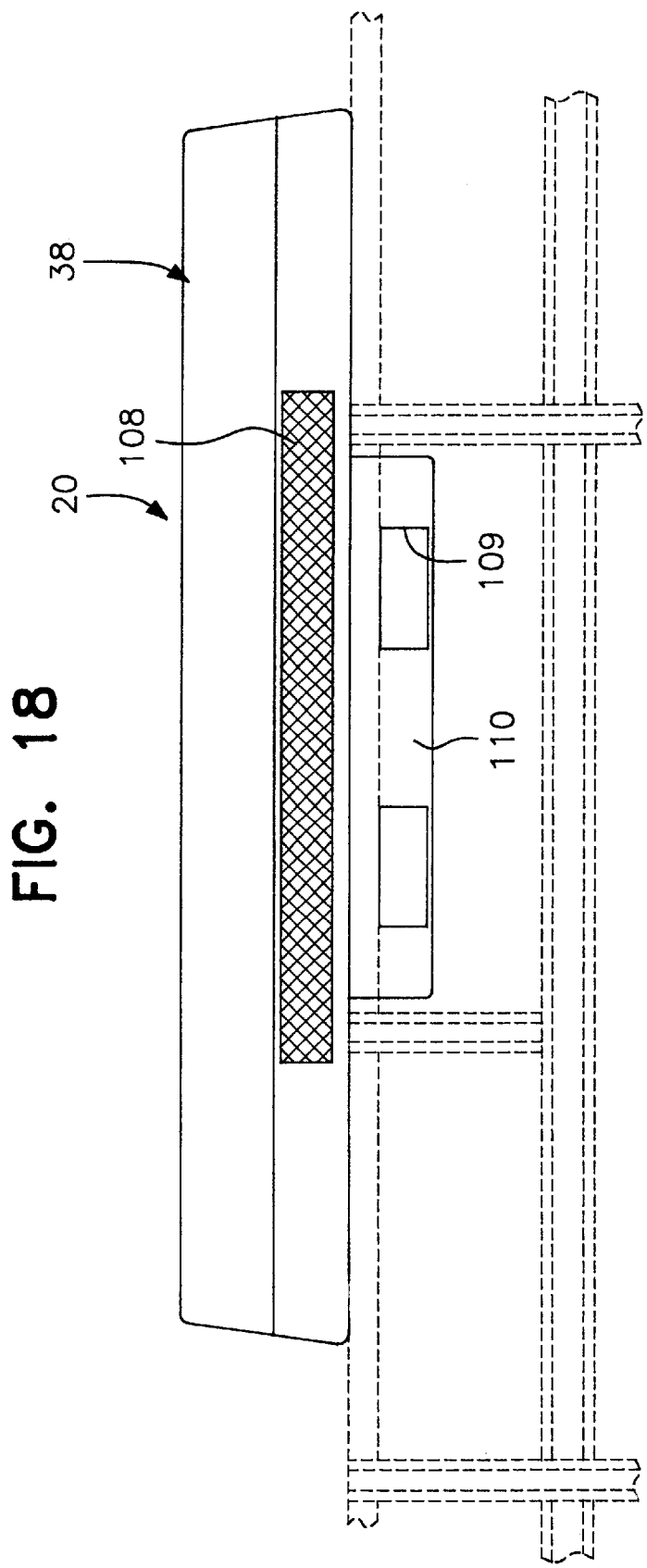

SELF-CONTAINED ROOFTOP HVAC UNIT

BACKGROUND OF THE INVENTION

1. Field of the Invention

The present invention generally relates to a heating, ventilating and air conditioning unit (HVAC) adapted for rooftop mounting on a bus or similar vehicle. More specifically, the present invention relates to an HVAC unit which is self-contained, lightweight and provides adequate cooling, heating and ventilation to a bus passenger compartment or the compartment of a similar vehicle.

2. Description of the Prior Art

Many vehicles are now equipped with heating, ventilating and air conditioning systems including built in climate control units in various vehicles and rooftop mounted units that are used primarily on passenger buses. In some known installations, the relatively heavy HVAC unit is mounted in the rear of the bus in or adjacent the engine compartment so that engine power can be used to power the unit. Also, rooftop mounted units are well known but are usually relatively heavy and in some instances require reinforcement structure incorporated into the bus body to support the HVAC unit. Also, presently available HVAC units frequently have interrelated components such that failure of one components renders the entire unit ineffective.

Previously known HVAC units do not incorporate the modularity concepts incorporated into the present invention including multiple condensers, evaporators and heating units with individual fans and blowers associated with the condensers and evaporators to enhance the modularity thereof and enable a lightweight, self-contained HVAC unit to be provided for rooftop mounting on a passenger bus or similar vehicle.

SUMMARY OF THE INVENTION

The HVAC unit of this invention includes a unique construction including condensers, evaporators, fans, blowers, heaters and compressor or compressors which results in a self-contained, lightweight, multi-functional unit for rooftop installation and modular component structure especially adapted for use in association with a passenger bus and mounted either as a single module or dual modules enabling it to be utilized with various size passenger buses. The HVAC unit has a unique cross-pattern arrangement of evaporator and condenser assemblies which enables air distribution from the system to function in a ducted system or a free blow system depending upon orientation of the condensers and evaporators. The HVAC unit is of compact construction and includes modular characteristics provided by the allocation of one fan to one condenser and one blower to one evaporator to enhance system performance and system redundancy. The HVAC unit include diagonal symmetry of components which further improves modularity, commonality and serviceability.

The HVAC unit of the present invention also preferably includes intakes for makeup fresh air that are directed through a cold evaporator plenum to allow the hot ambient makeup air to be precooled and predehumidified before entering the evaporator and then into the passenger compartment of a bus or similar vehicle. The unique construction of the HVAC unit enables it to be oriented in various modular arrangements so that it can be used as a single module for small or medium sized buses and as dual modules for medium to large size buses with the unique structural characteristics enabling the HVAC unit to be used in a ducted air circulation system or a free blowing air circulation system.

Accordingly, an object of the present invention is to provide an HVAC unit especially adapted for use on passenger buses constructed for rooftop mounting either in a ducted air circulation system or free blowing air circulation system with the unit being lightweight, compact and modular in construction.

Another object of the invention is to provide an HVAC unit for bus rooftop mounting utilizing a cross-pattern orientation of evaporators and condensers including a fan for each condenser and a blower for each evaporator enabling a modular, simple and redundant structure and performance.

A further object of the invention is to provide an HVAC unit in accordance with the preceding objects in which the diagonal or cross-pattern symmetry of component arrangement effectively provides ease of serviceability by modularity arrangements which simplifies installation and repair utilizing common units in the cross-pattern arrangement.

Still another object of the invention is to provide an HVAC unit in accordance with the preceding objects in which fresh air makeup in the air circulation system is ducted through a cold evaporator plenum which allows hot ambient makeup air to be precooled and predehumidified before passage through the evaporator and discharge into the bus passenger compartment.

A still further object of the invention is to provide an HVAC unit of modular construction to enable climate control in various size buses by using a single unit for small to medium size buses and a dual unit for medium to large size buses.

These together with other objects and advantages which will become subsequently apparent reside in the details of construction and operation as more fully hereinafter described and claimed, reference being had to the accompanying drawings forming apart hereof, wherein like numerals refer to like parts throughout.

BRIEF DESCRIPTION OF THE DRAWINGS

FIG. 14 is a side elevational view of a bus utilizing a single modular HVAC unit installed in accordance with the present invention;

FIG. 15 is a front elevational view of the assembly of FIG. 14;

FIG. 16 is a schematic side elevational view of a larger bus with dual module HVAC units installed in accordance with the present invention;

FIG. 17 is a front elevational view of the assembly of FIG. 16; and

FIG. 18 is an enlarged schematic elevational view of the modular unit and ducted arrangement for air circulation in relation to the interior of a bus compartment in accordance with the present invention.

DESCRIPTION OF THE PREFERRED EMBODIMENTS

Figure 1:
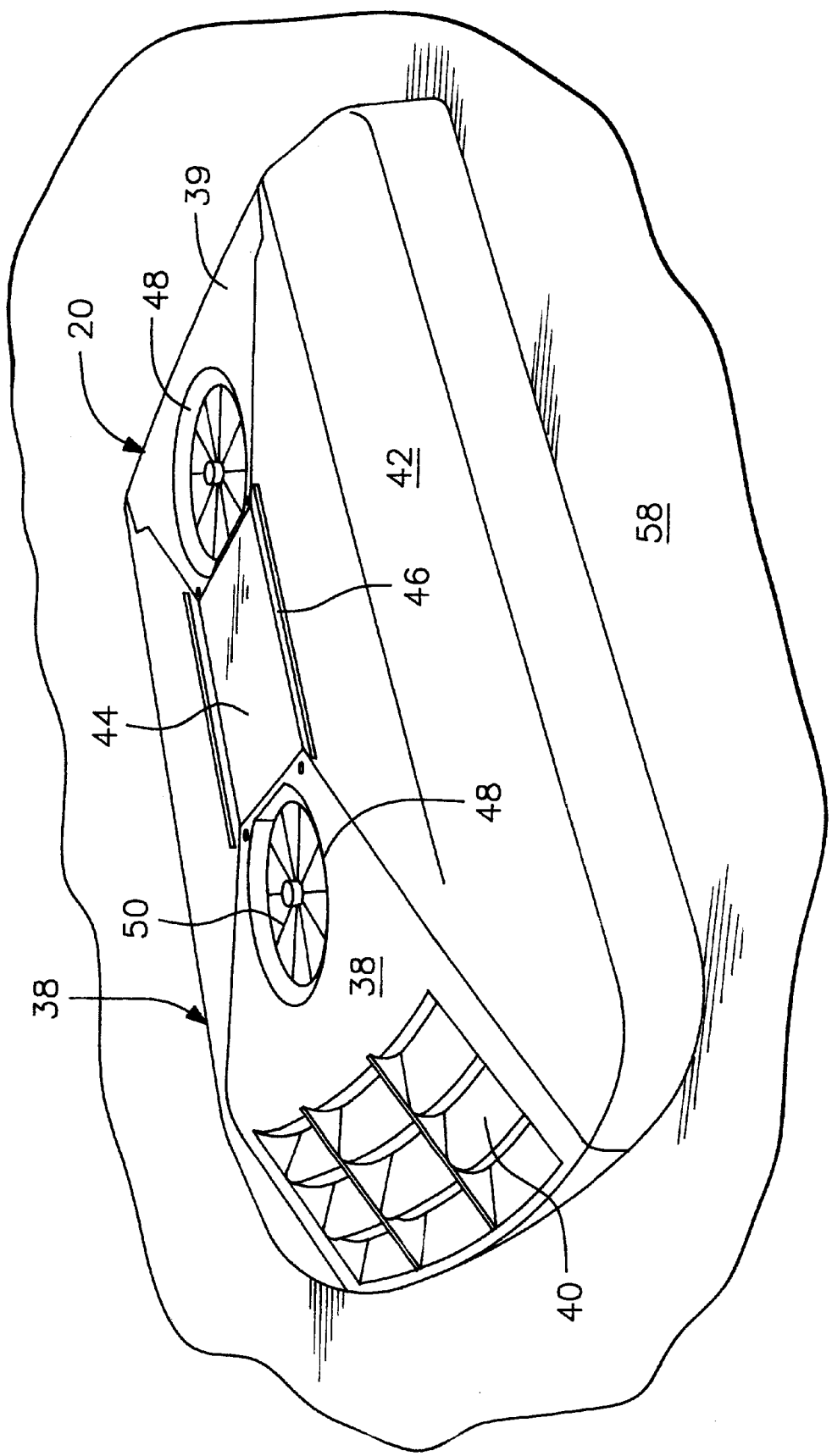
FIG. 1 is a perspective view of one embodiment of the HVAC unit of the present invention installed on a bus roof.
Figure 2:
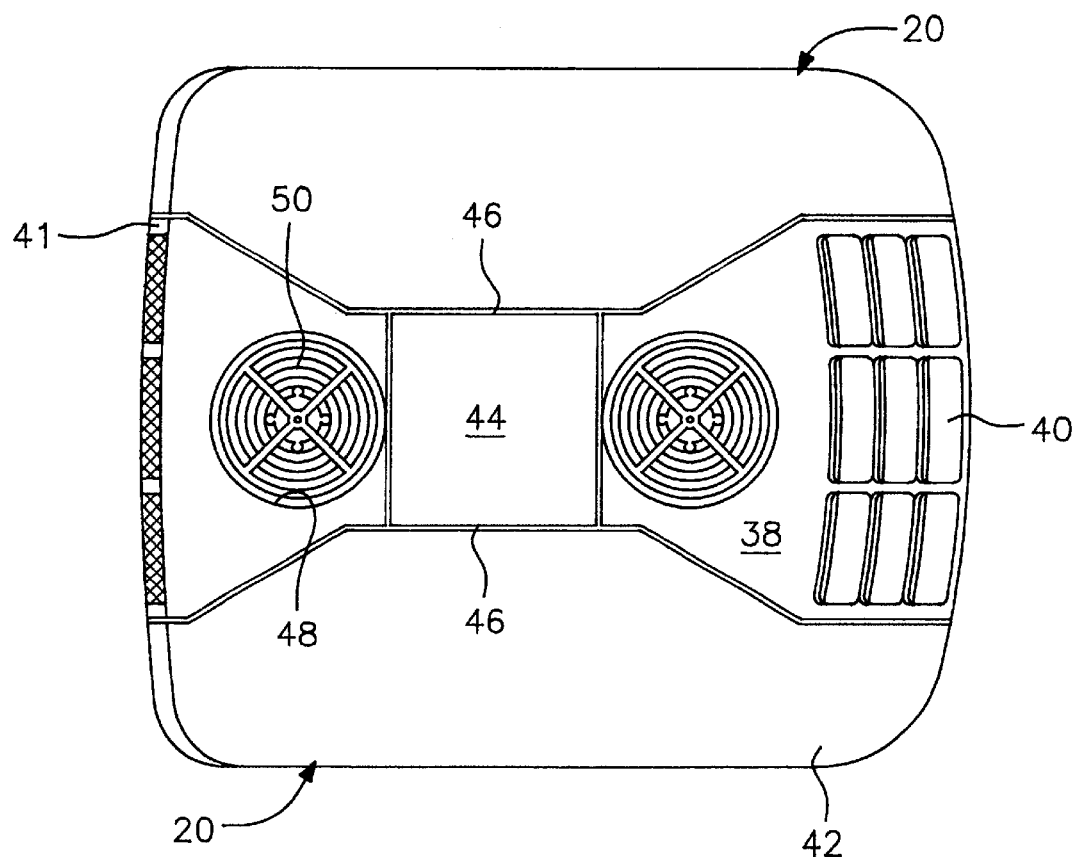
FIG. 2 is a top plan view of the HVAC unit illustrated in FIG. 1.
Figure 3:
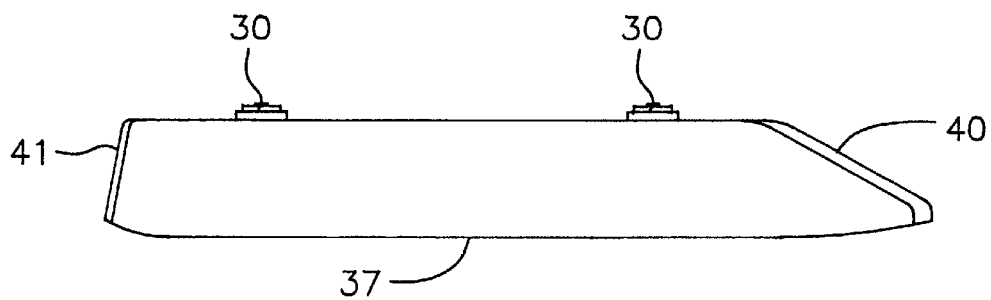
FIG. 3 is a side elevational view thereof.
Figure 4:
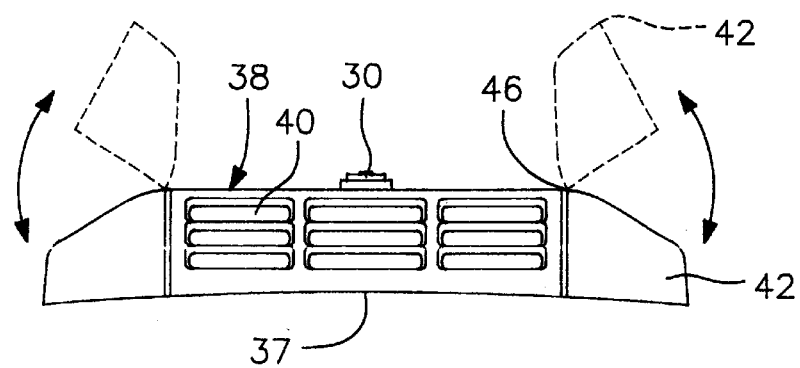
FIG. 4 is a front elevational view thereof.

Although only a few preferred embodiments of the invention are explained in detail, it is to be understood that the invention is not limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity. It is to be understood that each specific term includes all technical equivalents which operate in a similar manner to accomplish a similar purpose.

Figure 5:
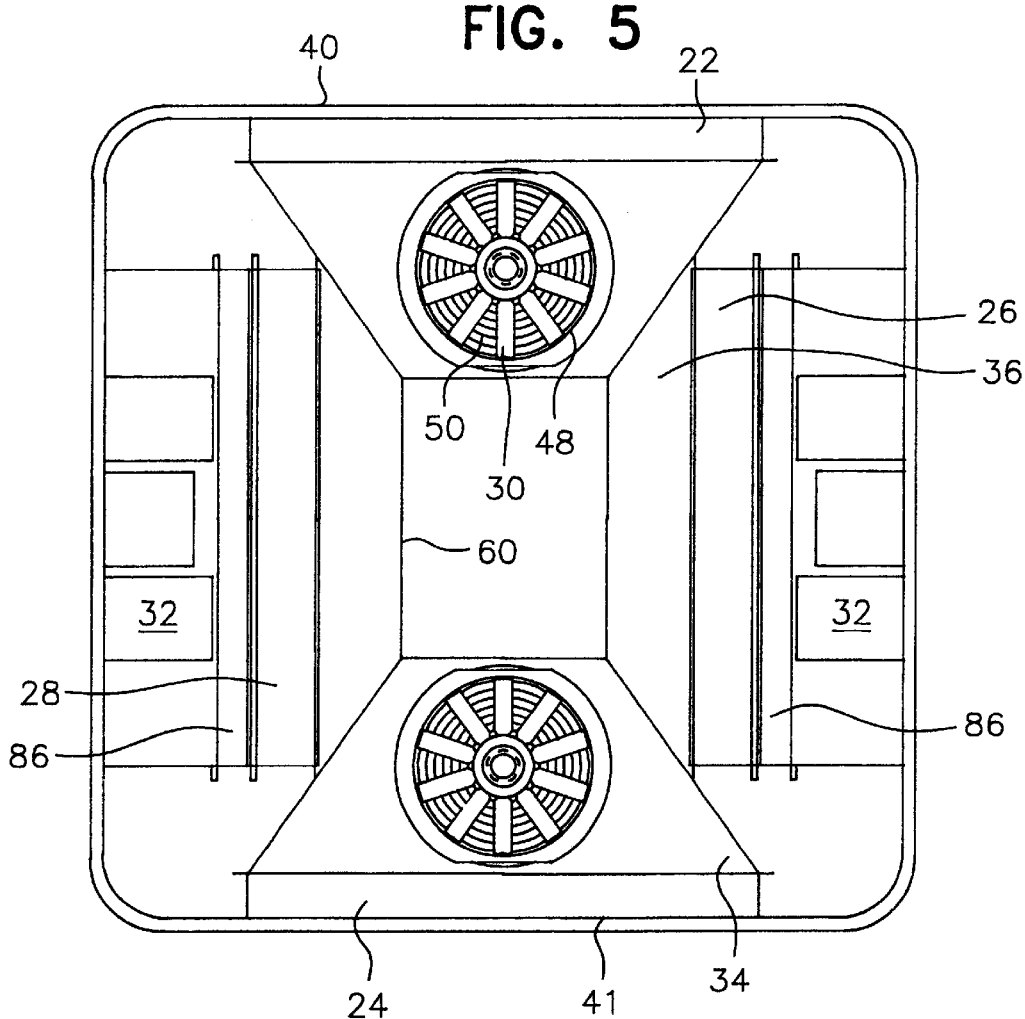
FIG. 5 is a schematic top plan view of the HVAC unit of FIG. 1 illustrating the association of the modular components thereof.
Figure 6:
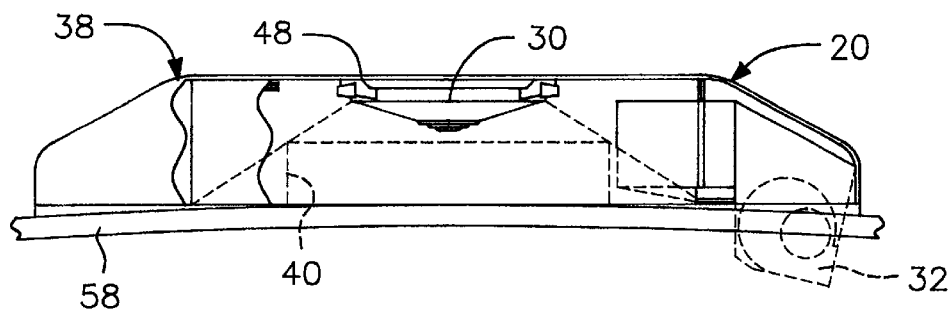
FIG. 6 is a schematic end elevational view illustrating the association of the components and association with a bus roof.
Figure 7:
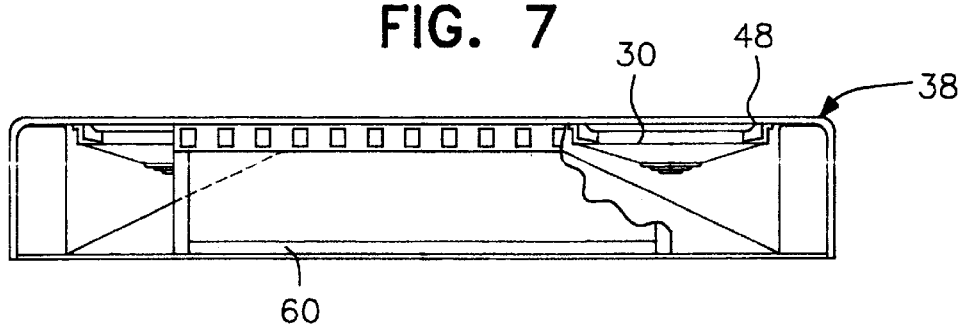
FIG. 7 is a schematic side elevational view of the HVAC unit of FIG. 1 illustrating the association of the condensers and fan with a bus roof.
Figure 8:
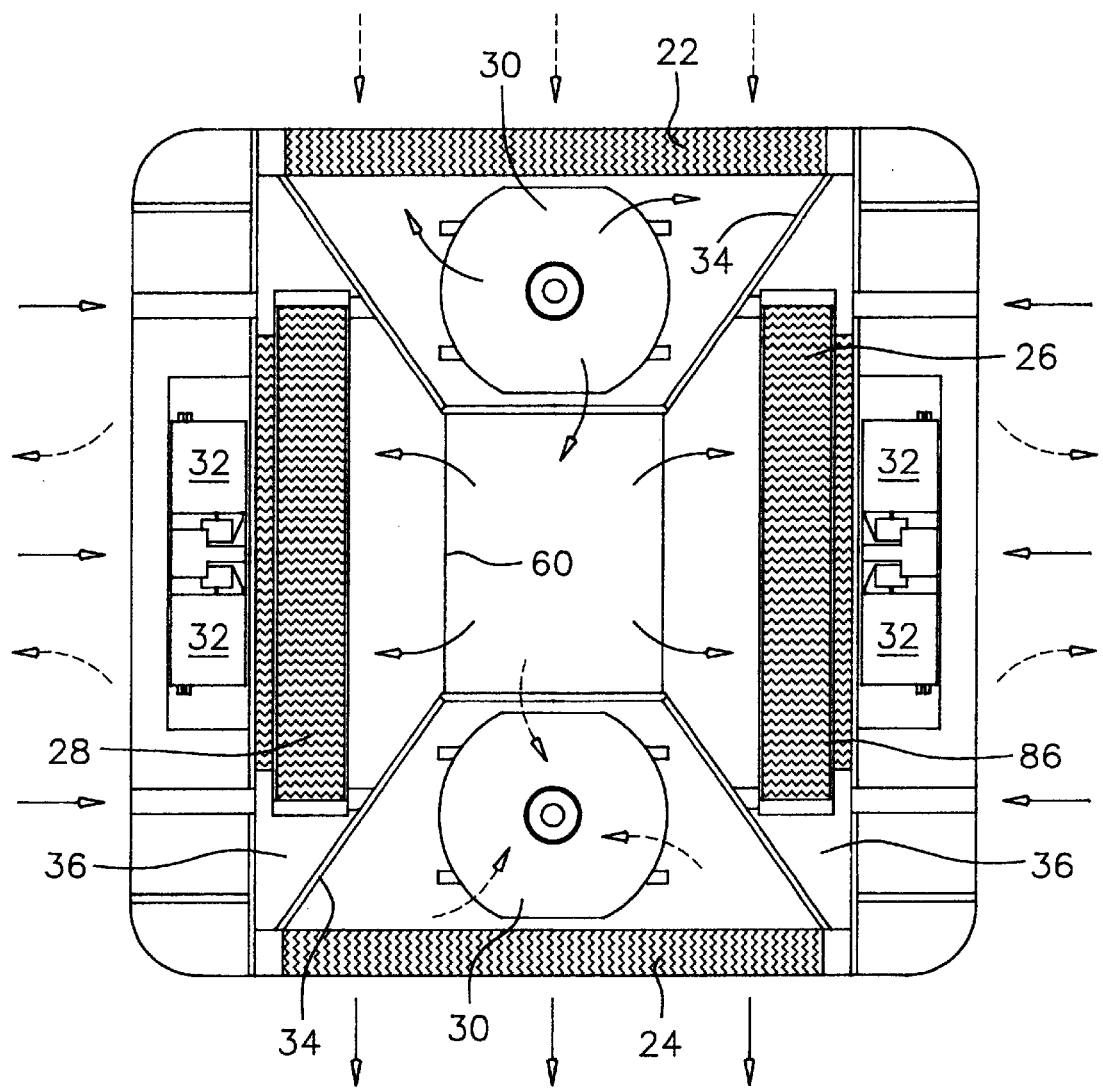
FIG. 8 is a top plan schematic view illustrating the relationship of the components of the HVAC unit of the present invention.
Figure 9:
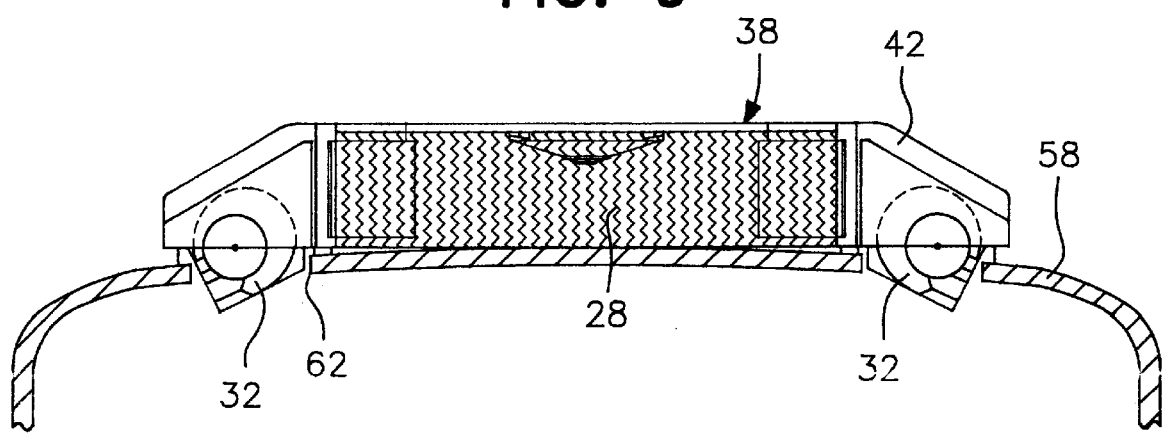
FIG. 9 is a transverse sectional schematic view illustrating the association of the evaporator blowers with the bus roof.

Referring now specifically to FIGS. 1–10 of the drawings, the roof mounted HVAC unit of the present invention is generally designated by reference numeral 20 and includes a front condenser 22, a rear condenser 24 and side mounted evaporators 26 and 28 (see FIGS. 5 and 8). Axial flow fans 30 are associated with each of the condensers 22 and 24, and tangential discharge blowers or impellers 32 are associated with each of the evaporators 26 and 28. The fans 30 and condensers 22 and 24 are oriented in condenser plenums 34, and the evaporators 26 and 28 and blowers 32 are oriented in evaporator plenums 36 as illustrated in FIG. 8.

The components are disposed in a housing or cabinet generally designated by the numeral 38 which includes a base or bottom 37 and a top or cover 39 which includes front openings 40 having dampers or louvers, rear openings 41 having dampers or louvers and a central panel 44, all rigidly connected together. Side panels 42 are separate from central panel 44 and are connected thereto by hinge structures 46 which enable the side panels 42 to pivot upwardly as illustrated in broken line in FIG. 4. When side panels 42 are pivoted upwardly, access to the interior of the cabinet 38 is provided including access to the evaporators 22 and 28, evaporator plenums 38 and evaporator blower or blowers 32 and certain control units thereby facilitating servicing of the HVAC unit. As illustrated in FIG. 1, the top of the cabinet or housing 38 is provided with longitudinally spaced openings 48, preferably circular in shape, for the axial flow fans 30 positioned inwardly thereof. The openings 48 are provided with a protective screen or grid 50 to protect the axial flow fans 30 and prevent accidental contact with the fans 30.

Figure 10:
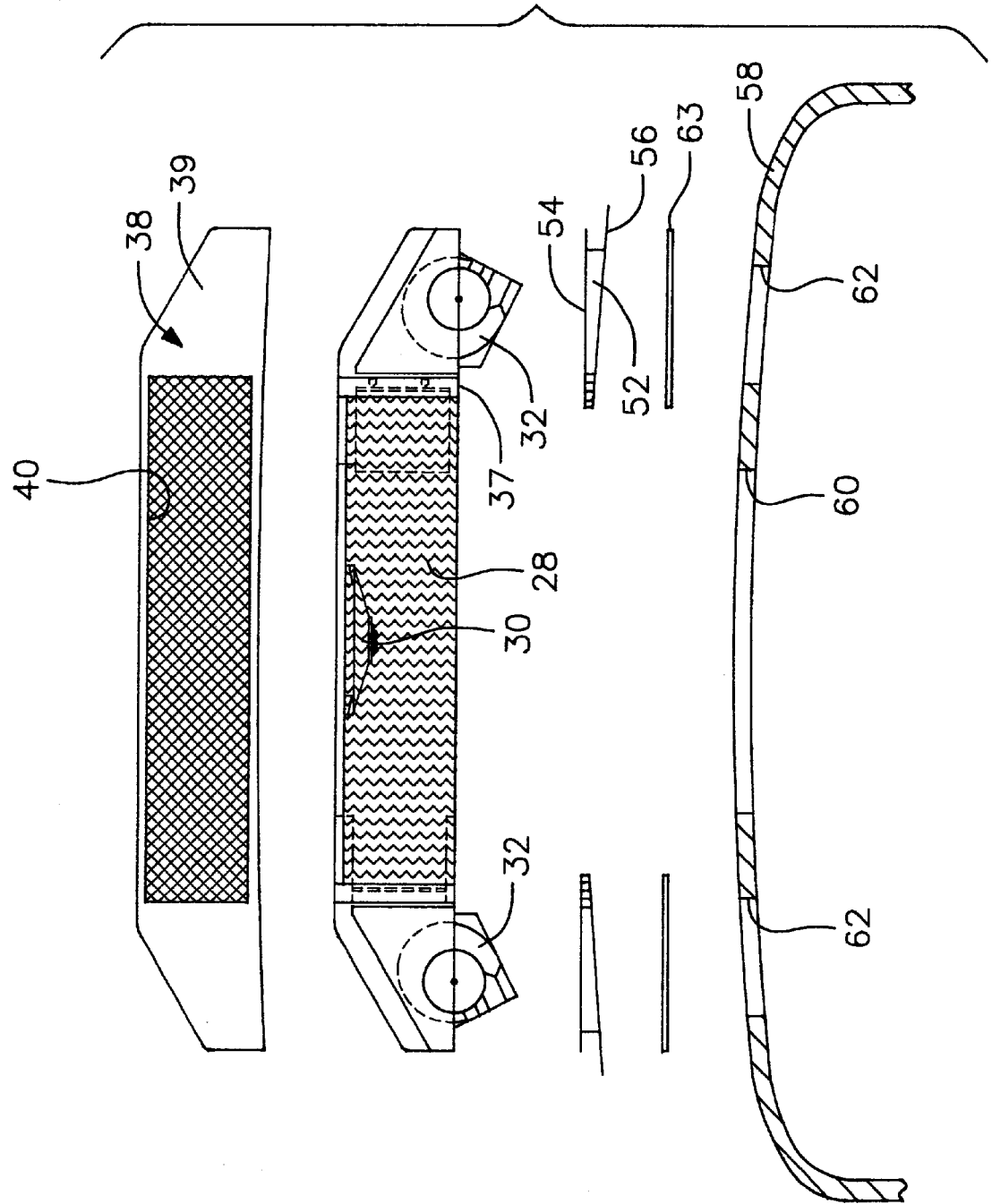
FIG. 10 is an exploded front schematic view illustrating the components of the HVAC unit of FIG. 1 and the bus roof.

As illustrated in FIG. 10, the cover 39 of the cabinet or housing 38 has the inlet 40 schematically illustrated therein.

The orientation of the blowers 32 is illustrated along with a spacer 52 having an upper rail surface 54 and a lower rail surface 56 in angular relation to each other to adapt the base 37 of the cabinet 38 of the HVAC unit to the roof 58 of a passenger bus. As illustrated, the passenger bus roof 58 includes a large return air opening 60 and a pair of smaller conditioned air passageways 62 which align with the discharge of the blowers 32. In this fashion, the air from the passenger compartment is circulated up through the opening 60, through the evaporators 26 and 28 and through the blowers 32 for reentry into the passenger compartment of the bus through the openings 62 in the bus roof 58. A spacer and seal 63 is provided to seal the components of the HVAC unit to the roof of the bus with any suitable fastening arrangement being utilized to secure the HVAC unit 20 in sealed and secure mounted arrangement on the roof 58 of the bus.

Figure 11:
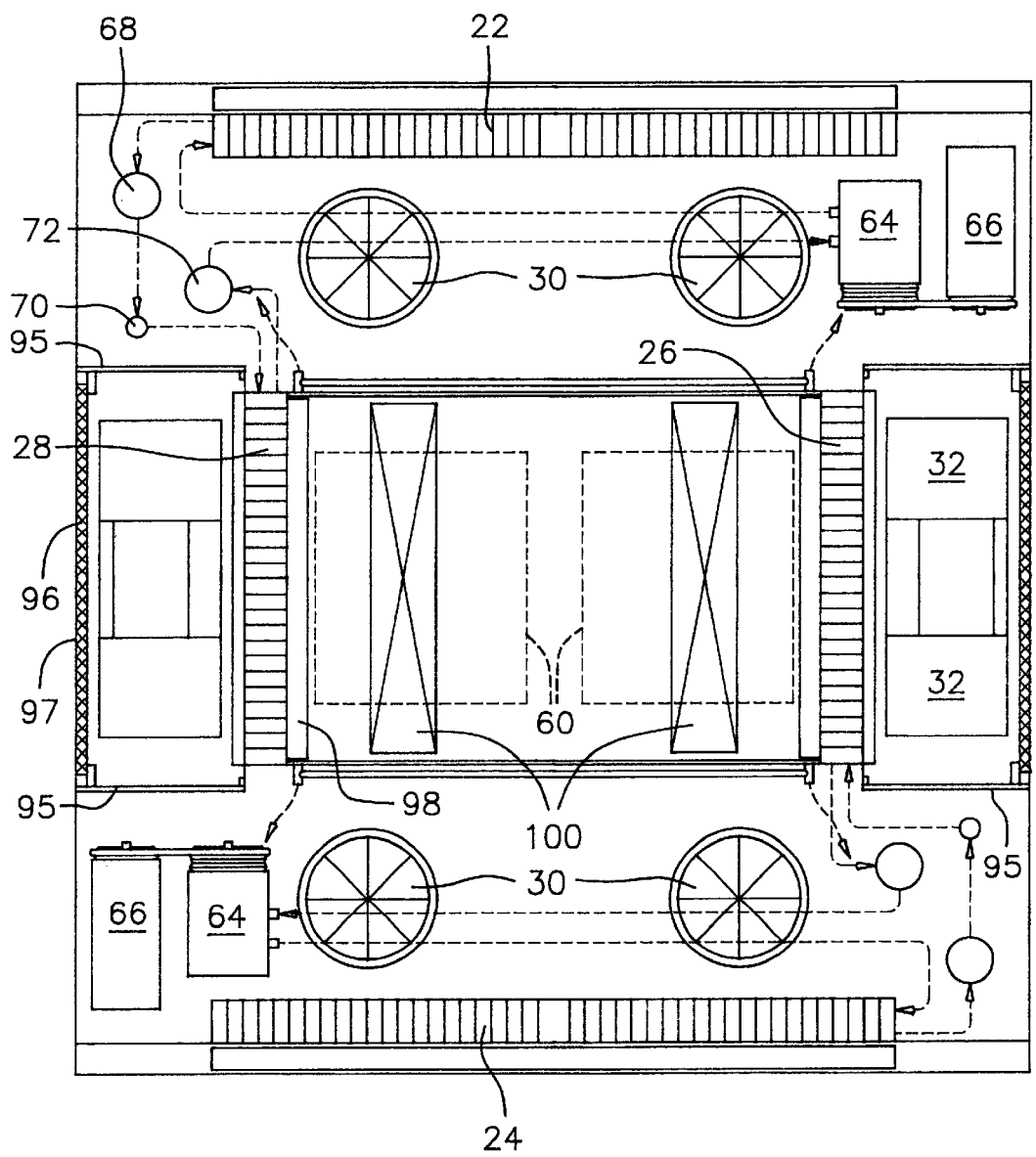
FIG. 11 is a top plan schematic view illustrating another embodiment of the present invention utilizing certain dual components and climate control arrangements.
Figure 12:
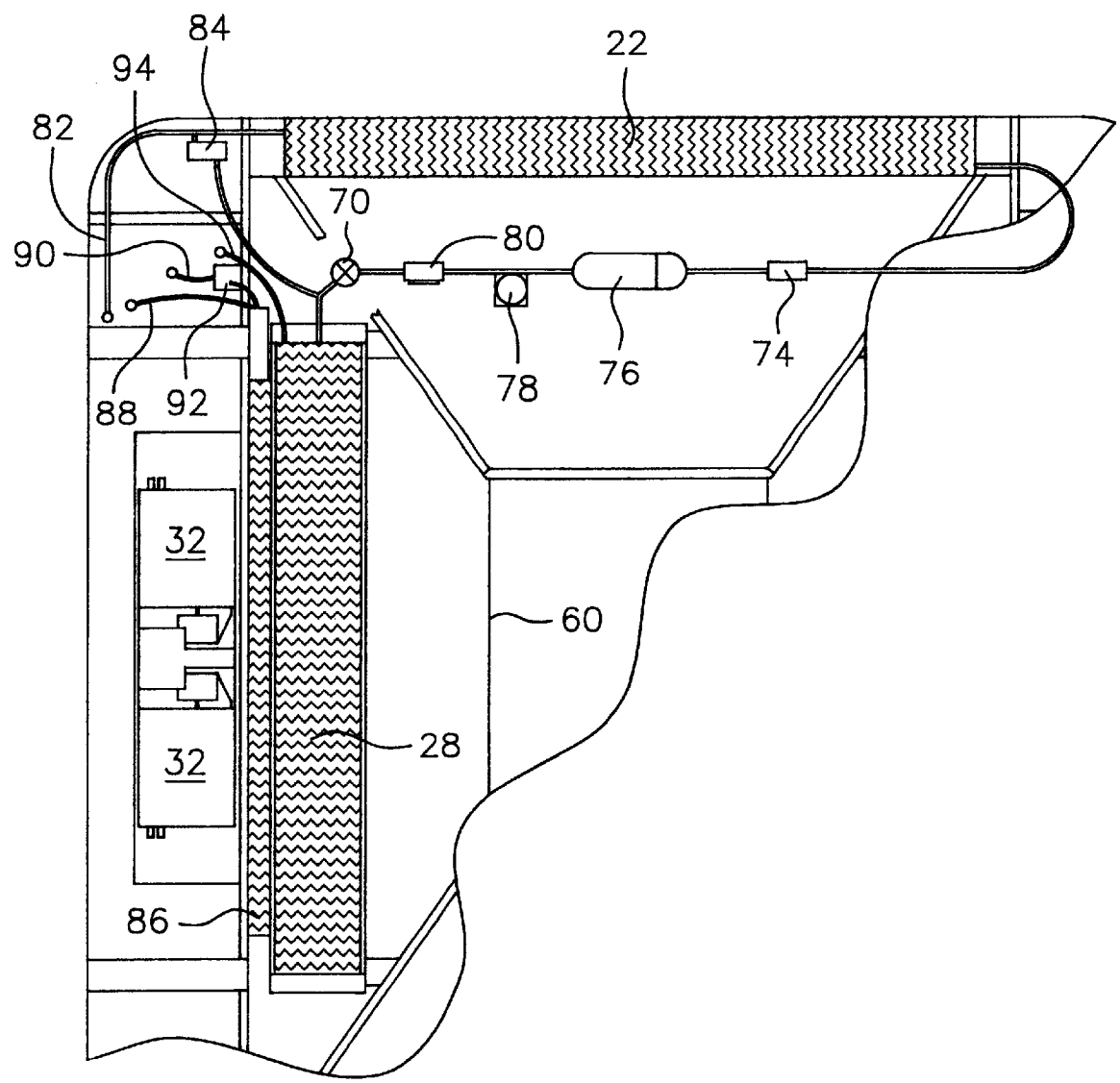
FIG. 12 is a fragmentary detailed schematic plan view illustrating the association of the controls for the HVAC unit of FIG. 11.

FIGS. 11 and 12 schematically illustrate a split air conditioning system especially adapted for electric buses in which the components are oriented in generally the same manner as previously described except that each condenser includes two air circulating fans 30. Also, FIG. 11 illustrates the orientation of a compressor 64 and compressor motor 66 associated with each of the condensers 22 and 24 and each of the evaporators 26 and 28. The compressor 64 discharges into adjacent condenser 22 with the condensed refrigerant being discharged into a receiver/dryer 68 and thus through an expansion valve 70 into an evaporator 28 with the return line to the compressor 64 including an accumulator 72 all of which represent standard operative components in a refrigeration system. FIG. 12 illustrates in more detail the preferred refrigerant circuit, including the use of a shut off valve 74, a filter dryer unit 76, a sight glass 78, a shut off valve with a service port 80 and their association with the expansion valve 70. This circuit permits expansion of liquid refrigerant through the evaporator 28 back to a refrigerant discharge line 82 which includes a discharge bypass valve 84 therein. FIG. 12 also illustrates the option of including a heater 86 associated with a water supply line 88 and a water return line 90 as well as modulation valve 92 and a refrigerant suction line 94 back to the compressor 64. The refrigerant circuit is schematically illustrated in FIG. 11 and more detailed in FIG. 12 with each of the compressor, expansion valve, evaporator and condenser functioning in a manner well known in the refrigeration art.

FIG. 11 illustrates schematically other additional preferred features including insulated partitions 95 to separate cold and warm areas within the housing 38, and an inlet air filter 96 associated with each of the evaporator plenum chambers 36 to provide inlet of makeup fresh air. The air filter 96 also includes an air damper 97 for control of makeup fresh air. Further, individual drain pans 98 may be provided for each of the evaporators to remove any liquid material that may condense on the cold evaporators during operation and the drain pans may be drained in any suitable manner to a point externally of the HVAC unit. Also, a pair of return air inlets 60 are included along with return air dampers 100 to control the return of circulated air from the passenger compartment for passage through the evaporators 26 and 28 with the air circulation being induced by the blowers 32. The blowers 32 may be any suitable squirrel cage fan or similar tangential blower.

Figure 13:
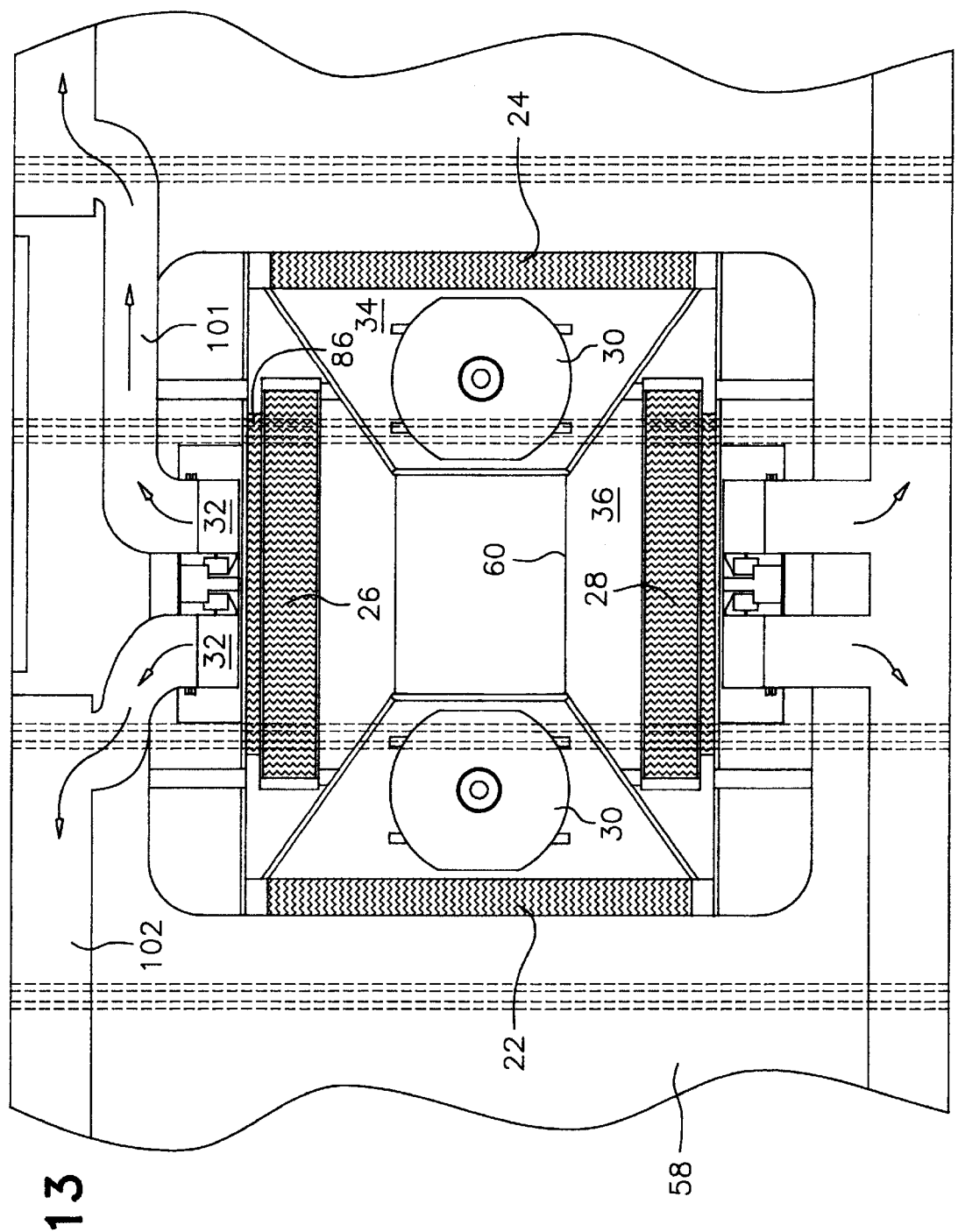
FIG. 13 is a schematic plan view illustrating a ducted system associated with a bus having a central door.

FIG. 13 illustrates the HVAC unit of the present invention associated with a ducted air circulation system including discharge ducts 101 and 102 that are associated with the evaporators 26 or 28. Discharge ducts 101 and 102 connect with ducts or passageways extending longitudinally of the bus to discharge air at any desired location. Both of the evaporators 26 and 28 may be associated with ducts or only one may be associated with ducts and the other can be free blowing. Alternatively, both of the evaporators can be associated with a free blowing air circulation system with suitable controls, dampers and deflectors provided for optimum circulation of air in relation to the passenger compartment of the bus.

FIGS. 14 and 15 schematically illustrate the association of an HVAC unit of the present invention as designated by reference numeral 20 associated with a smaller or medium size bus 104 and being mounted generally at a central location on the bus roof 58. As schematically illustrated, the inlet 40' at the front and openings at the rear are associated with the housing for the HVAC unit and a makeup opening 105 is provided on the side areas of the cover 39 of the HVAC unit to provide inlet of makeup fresh air to the air circulation system. FIGS. 16 and 17 illustrate a larger bus 106 having a pair of HVAC units 20 mounted thereon in longitudinally spaced relation. The HVAC unit in each instance is provided with front and rear air inlets 107 at the front and rear and makeup fresh air inlets 108 on each side thereof. FIG. 18 illustrates in more detail, the position of the side air inlets 108 and also illustrates schematically the housing 110 including duct work or outlets 109 which extend into the bus passenger compartment and facilitate distribution and circulation of air in the compartment.

The HVAC unit of this invention is generally rectangular or square with the external configuration being smoothly rounded and provided with surfaces which create minimum wind resistance. When installed on the upper surface of the roof of a passenger bus, the condensers are oriented forwardly and rearwardly while the evaporators are oriented in laterally spaced relation generally parallel to the side edges of the bus. Dimensional characteristics will vary depending upon the installation requirements. In one embodiment of the HVAC unit, the length of the unit is approximately 80 inches, the width approximately 66 inches and the height approximately 9 inches. Each of the condenser fans is an axial flow fan powered by a DC motor and each of the evaporator blowers is a radial flow, tangential discharge blower or impeller oriented in side-by-side, spaced relation with a single DC motor driving both blowers for each of the evaporators. The capacity of the fans and blowers is adequate to provide circulation of ambient air in relation to the condensers and circulation of passenger compartment air through the evaporators. The sides of the housing are each provided with an air inlet controlled by dampers to control the percentage of fresh air introduced into the circulating system.

Various options may be provided such as auxiliary electric heating elements and other components when the system is used as a heat pump. The controls for the unit may include a microprocessor with selected functions. An electric power pack may be utilized with a single compressor, condenser and evaporator when the HVAC unit is mounted on an electrically powered vehicle. When the engine of the bus is used to power the HVAC unit, either one or two motor driven compressors, evaporators and condensers may be used. The HVAC unit provides a self-contained, multifunctional climate control system mounted on the rooftop of the bus and satisfies requirements for use in various types of bus service situations. The HVAC unit is lightweight, high capacity, easy to install, economical in operation and easy to service. The diagonally arranged components include modular design concepts to enable redundancy of operation and maximum serviceability.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A HVAC unit adapted to be mounted externally on the roof of a passenger bus and in communication with the interior of the bus, which comprises a housing having a forwardly facing opening, a rearwardly facing opening and a pair of spaced upwardly facing openings, a pair of condenser plenums mounted interiorly of said housing, one of said condenser plenums forming an air flow passage between the forwardly facing opening and one of the upwardly facing openings, the other condenser plenum forming an air flow passage between the other upwardly facing opening and the rearwardly facing opening, a refrigerant condenser mounted in each of said condenser plenums in said air flow passages, said housing having an air inlet adapted to be communicated with the interior of a bus and a conditioned air passage to return conditioned air to the interior of a bus, a pair of refrigerant evaporator plenums mounted in said housing in communication with said air inlet and conditioned air passages to form air flow passages between said air inlet and said conditioned air passage, a refrigerant evaporator mounted in each of said evaporator plenums in said air flow passages, a fan in each condenser plenum for circulating air through each air flow passage and each condenser, a conditioned air blower mounted in said housing for circulating air from the interior of the bus, in through the air inlet, through the evaporators and out through the conditioned air passage back into the interior of the bus, said housing including at least one motor driven compressor and refrigerant circulation system associated with said condensers and evaporators for conditioning air moving from and to the interior of the bus.

2. The HVAC unit as defined in claim 1, wherein said air inlet between the interior of the bus and the evaporator plenums includes dampers for controlling circulation of air from the interior of the bus through the evaporators and back to the interior of the bus.

3. The HVAC unit as defined in claim 2, wherein said conditioned air passage communicating with the interior of the bus is in communication with a duct system for discharging air throughout the interior of the bus.

4. The HVAC unit as defined in claim 1, wherein said conditioned air blower discharges conditioned air into free blowing communication with the interior of the bus.

5. In combination with a vehicle having an occupant compartment having a roof with a top surface, a HVAC unit mounted externally on said roof and in communication with said occupant compartment, said HVAC unit comprising a cabinet having a forwardly facing opening, a rearwardly facing opening and a pair of upwardly facing openings, a forward condenser plenum interiorly of said cabinet in communication with said forwardly facing opening and one of said upwardly facing openings, a rearward condenser plenum in communication with said rearwardly facing opening and the other upwardly facing opening, said condenser plenums providing air flow passages through the cabinet, a condenser mounted in each of said condenser plenums in said air flow passages, a fan in each condenser plenum for circulating air through said air flow passages and through said condensers, a pair of evaporator plenums mounted interiorly of said cabinet to form air flow passages, a conditioned air inlet in said cabinet communicated with said occupant compartment and with said evaporator plenums and evaporators, a pair of air blowers mounted in said cabinet in communication with said air inlet and evaporator plenums for moving conditioned air through said evaporators, each of said air blowers having a discharge in communication with the occupant compartment of said vehicle for circulating air from the occupant compartment, in through the air inlet, through said evaporators and out into the occupant compartment, said cabinet including a motor driven compressor and refrigerant circulation system associated with said evaporators and condensers for circulating conditioned air from and to the occupant compartment of the vehicle.

6. The combination as defined in claim 5, wherein said cabinet includes pivotal external wall portions covering the evaporator, and refrigerant circulation system, said cabinet also including a removable panel providing access to the condensers thereby providing service capabilities to the components of the refrigeration system.

\* \* \* \* \*